United States Patent Office 3,406,711
Patented Oct. 22, 1968

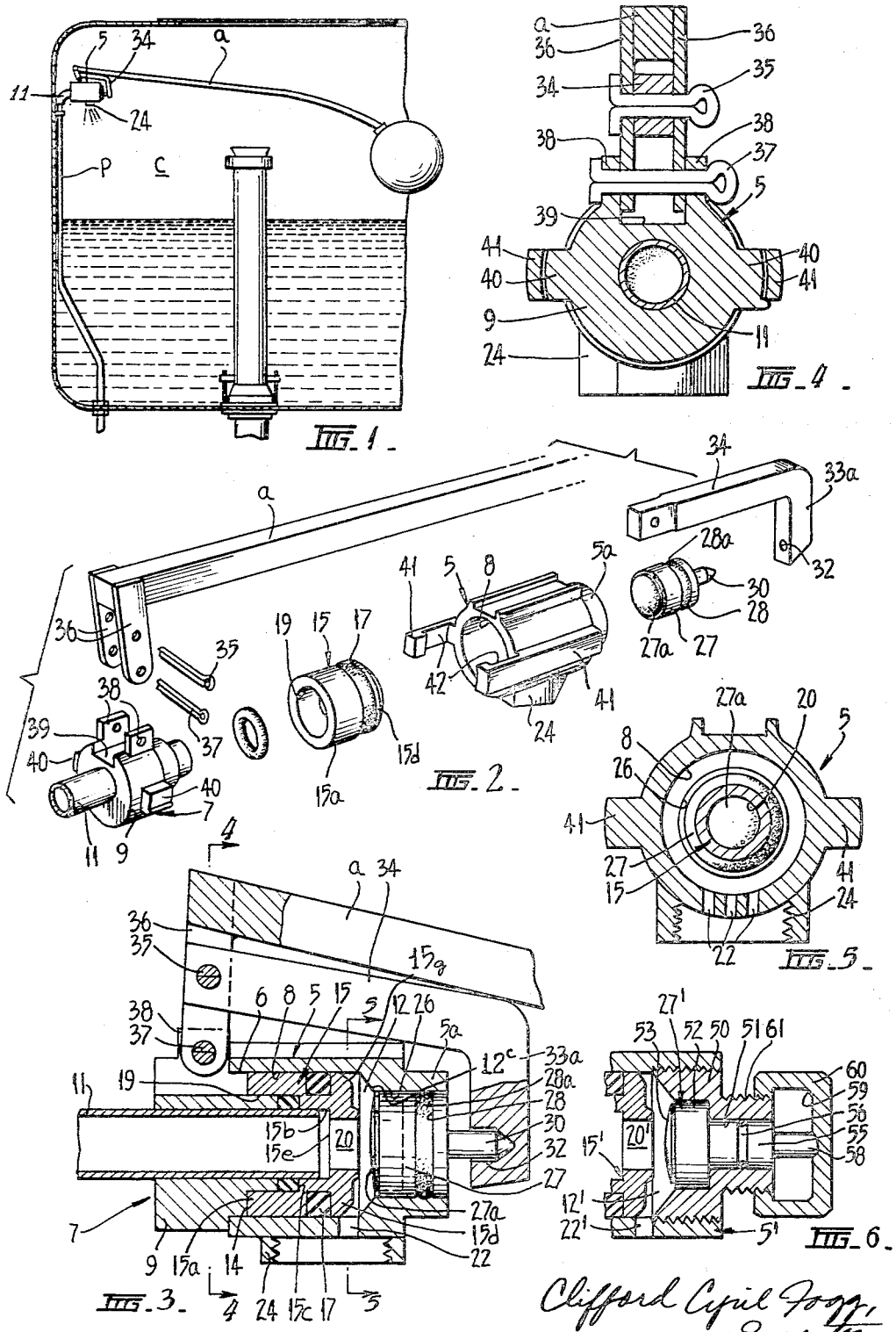

3,406,711
FLOAT CONTROLLED VALVES
Clifford Cyril Fogg, East Malvern, Victoria, Australia, assignor to Edward J. Brown, Canterbury, Victoria, Australia
Filed Jan. 17, 1966, Ser. No. 521,000
Claims priority, application Australia, Jan. 22, 1965, 54,255/65
4 Claims. (Cl. 137—443)

ABSTRACT OF THE DISCLOSURE

A liquid float control valve that may be either manually operated or float controlled having a valve chamber with a valve member axially movable responsive to liquid pressure to control a discharge port in the valve chamber. A coaxial slidable valve seat has an inlet port communicating with a liquid supply passage and is axially movable responsive to liquid pressure upon actuation of the valve member. The area of the discharge port is less than the inlet port which is normally closed by the valve member.

---

This invention relates to liquid flow control valves and is particularly though not exclusively directed to float controlled valves for use in the flushing cistern of latrines, water closets and the like.

The noise factor in the float controlled valves of cisterns has been troublesome since their adoption due to the inevitable hiss or "whistle" that occurs during the final closure movement of the valve as the float reaches the maximum permissable level of water in the cistern.

This noise is most objectionable in the low level cistern as now commonly in used indoor toilets, and although a considerable number of float controlled valves have been designed to eliminaten the noise, none to the applicant's knowledge has been entirely efficient or satisfactory.

It is the principal objective of this invention to provide an improved effective liquid flow control valve that may be manually controlled for use as a tap or cock when required or conveniently adapted for use as a float controlled valve in the flushing cistern of latrines, water closets and the like.

It is a further objective of the invention to provide an improved effective float controlled valve having a quick and positive closure responsive to the rise of the float member for convenient and useful application to cistern valves to effect a quick shut off with attendant elimination or at least reduction to a minimum of the above-mentioned objectionable noise.

It is moreover an important specific objective of the instant invention to provide an efficient float controlled valve having as well as the above important advantages, the desirable feature of being capable of economical mass production, assembly and convenient mounting in a cistern.

With the above stated principal objective in view there is provided according to the invention a liquid flow control valve comprising a valve chamber, a valve member axially movable in said chamber, to and retainable in a closed position until released for a liquid pressure responsive retractive move to an open position, a spaced coaxial valve seat axially slidable responsive to liquid pressure relatively to the valve member to normally engage with the latter in its closed position and having a port for constant communication with a liquid flow supply, said port in the open position of the valve member disposed to communicate with at least one liquid outlet port in the valve chamber of relative lesser area, the relative arrangement of said valve seat and valve member and the relative areas of the said ports being such that said valve seat and valve member are axially displaced apart from the closed position responsive to pressure of water developed in the valve chamber upon the valve member being initially released to move ot the open position and said valve seat subsequently effects an accelerated retractive movement to reengage with the valve member responsive to the pressure in the liquid flow supply exceeding the pressure in the valve chamber resultant upon the actuated return of the valve member to the closed position.

In an important application of the control valve to a flushing cistern the valve member is arranged to be actuated responsive to a float arm for axial movement to the closed position and the spaced coaxial valve seat is slidable within the valve body responsive to the water pressure, having a port for constant communication with a water inlet supply and normally engaged by the valve member in its closed position; said valve seat effecting the accalerated retractive movement to re-engage with the valve seat responsive to the pressure in the water inlet pipe exceeding the pressure in the valve chamber resultant upon the float arm actuated return of the valve member to the closed position.

The coaction of the valve member with the coaxial axially slidable valve seat, and relative areas of the porting of the latter is such that the initial entry of cistern replenishing water into the valve chamber sets up pressure sufficient to axially displace or move said valve seat away from the valve member and the latter freed from the influence of the float arm to the open position so as to fully open the ports in the valve chamber so as to provide a rapid discharge of water from the valve into the cistern.

This action continues until the rising float arm exerts a thrust upon the valve member to move the latter towards the closed position and slidable valve seat to reduce the capacity of the valve chamber. The water flowing through the port in the valve seat into the valve chamber is then reduced with resultant reduction in pressure until the point is reached where the pressure in said chamber is less than the pressure of the incoming water applied under or behind said valve seat. Then the valve seat returns quickly to firmly contact the valve member which has moved to the closed position responsive to the rising of the float arm to close the inlet port in said seat and thereby prevent communication with the outlet port or ports in the valve chamber and thus shut off the flow of replenishing water to the valve chamber.

The accompanying drawings depict two practical arrangements of the liquid flow control valve as incorporated in a flow controlled valve in a flushing cistern and a manually operable tap or stop cock.

In these drawings:

FIGURE 1 is a fragmentary view in section of the cistern showing the float controlled valve, mounted in position at the end of the water inlet pipe.

FIGURE 2 is an exploded perspective view illustrating the component parts of the float controlled valve.

FIGURE 3 is an enlarged central section of the float controlled valve.

FIGURE 4 is a section taken on line 4—4 of FIGURE 3.

FIGURE 5 is a section taken on line 5—5 of FIGURE 3.

FIGURE 6 is a view in section of the valve construction illustrated in FIGURES 1 to 4, modified to be used as a tap or cock.

Referring now to the drawings, the body 5 of the valve member is of open cylindrical form the outer end 6 of which has inserted therein the complemental closure member 7 neatly fitting the bore 8 of said body with the head 9 bearing against the face of the open end.

The inner end of the cylindrical valve body 5 is stepped, forming a reduced hollow stem.

The closure member 7 is axially bored to receive a central tube 11 projecting through said member as viewed in FIGURE 3, the outer end being connectable to the water inlet pipe p to the cistern c, with the inner end in communication with the valve chamber 12 formed in the valve body 5.

The internal end of the closure member 7 is stepped at two points to provide the support for the inner open end 6 of the valve body 5, and a seating 14 for the axially slidable valve seat indicated generally at 15 coaxially mounted upon the central tube 11 concentrically with the valve body 5 in slidable contact with the bore of the latter. The seating 14 includes the rubber washer or O ring to provide an effective water seal between the valve seat 15 and closure member 7. There is an annular groove in the surface of the slidable valve seat 15 to receive a sealing member 17 or O ring to maintain the seal between the bore 8 of the valve body 5 and slidable valve seat 15 as viewed in FIGURE 3.

The bore 19 of the slidable valve seat 15 is stepped to form the outer concentric section 15a which slides between the body of the closure member 7 and bore of the valve body 5, and the inner reduced section 15b which seats upon the inner end of the central tube 11. The head 15d of the valve seat projecting into the valve chamber 12 has a central port 20 in axially communication with the inlet tube 11, and opening directly into the valve chamber 12.

There are three spaced outlet ports 22 of circular cross section in the bottom of the valve chamber 12 at common radius, and disposed to be fully open when the slidable valve seat 15 is in the displaced position from the valve member as viewed in FIGURE 3.

The outlet ports 22 deliver in to the hollow threaded boss 24 upon the valve body 15 through which boss the replenishing water is delivered to the cistern c after a flushing operation.

There is slidably disposed in the reduced passage 26 through the inner stem 5a of the valve body 5, a piston valve member 27 having a head 27a composed of rubber or like material. As viewed in FIGURES 2 and 3, the piston valve member 27 has an annular groove 28 to receive a sealing member or O ring 28a to maintain the seal between said member and reduced passage 26.

The valve member 27, is axially movable to project into and withdraw from the valve chamber 12 responsive to the movement of the float controlled arm a in the cistern c.

To that end the piston valve member 27 has a central projecting stem 30 which freely enters the slot 32 in the annular outer limb 33a of the arm 34, the inner end of which is pivotally connected to the pin 35 carried in the short complemental arms 36 secured to and depending from the inner end of the float controlled arm a in the cistern c. By this arrangement the valve member 27 may be pushed in by the arm 34, but when the arm moves outwardly as the float arm goes down in a flushing operation the valve member 27 is free or released from said arm for outward water pressure responsive movement to the open position.

The short arms 36 are pivotally mounted upon the pin 37 inserted through the upstanding lugs 38, upon the head 9 of the closure member 7, the ends of said arms being accommodated in the groove 39 in the flange between the lugs.

As will be understood, a downward angular movement of the float controlled arm a during a flushing operation, transmits an angular movement to the angular arm 34 which effects an axial retractive movement of the valve member to allow the valve member 27 to be forced to the open position within the reduced passage 26 by the incoming water pressure, as viewed in FIGURE 3.

The valve body 5 and closure member 7 are maintained in assembly without the requirement of separating fastening elements such as screws or the like by the provision of diametrical opposite rectangular lugs 40 upon the head 9 of the closure member.

There are a diametrical opposite pair of projecting longitudinal ribs 41 upon the body 5 of the valve having transverse slots 42 formed therein adjacent one end in circumferential assembly alignment with the abovementioned lugs. Either the lugs 40 or the slots 42 may be tapered to effect a simple locking engagement in assembly. Upon the closure member 7 being inserted into the open end of the valve body 5 the lugs 40 align with the above slots 42 whereupon the valve body or closure member may be turned with a bayonet action to insert the lugs into the slots to prevent further relative axial movement of the assembled components. As the valve only requires two principal components which may be conveniently fitted together and maintained in assembly without the requirement of separate fastening means such as screws, it may be mass produced cheaply.

It is to be observed from examination of FIGURES 3 and 5 which are of the same proportions, that the overall area of the outlet or delivery ports 22 in the valve chamber 12 is less than the area of the central port 20 in the slidable valve seat 15 through which port the inlet water from the supply pipe p is delivered into said valve chamber.

Thus in operation as previously explained the float arm a upon falling during a flushing operation, releases the valve member 27 through the angular arm 34 to move to the open position (FIG. 3 in the reduced passage responsive to water pressure in the valve chamber, to thereby open the outlet ports 22. The water pressure also displaces the slidable valve seat 15 towards the valve member until the angular rim 15g on said valve seat strikes the center of the reduced conical section 12c of the valve chamber 12, to thus effect complete disengagement between the valve seat and valve member to leave the latter clear of and in advance of said valve seat. At this point pressure builds up in the valve chamber responsive to the pressure of the incoming water through the port 20 in the slidable valve seat 15 until acting upon the head 15d of the slidable valve seat 15 it is sufficient to effect an axial displacement of the valve seat away from the valve member 27, whereby the valve seat 15 and valve member 27 occupy the spaced apart fully open position shown in FIGURE 3.

As the float arm a consequent upon the filling of the cistern c rises, the valve member 27 is returned by the thrust upon its stem to the closed position in the valve chamber 12 to restrict the flow of water therethrough with resultant pressure drop until the pressure in the valve chamber is less than the pressure of the incoming water in the central tube 11 from the inlet pipe p.

The pressure of incoming water now applied to the inner annular face 15e about the centre port 20 of the slidable valve seat 15 initiates an axial retraction movement of the latter towards the valve member now in the projected position in the valve chamber, and at this stage under increasing pressure upon the inner face 15e of valve seat 15 in advance of the inner tube 11, it moves with acceleration into closure contact with the resilient face of the valve member 27.

The chamfered periphery of the head of the valve seat 15 engages the complementary surface in the bore of the valve body as the outer face bights into the resilient head of the valve member responsive to the pressure of incoming water to quickly and effectively close the outlet ports 22 in the valve chamber 12.

Referring now to FIGURE 6 the valve is shown modified for use as a manual tap or stop cock and to that end substantially the same valve body 5' at the open end accommodating the valve member 27', is internally threaded to receive a stepped boss 50 having a central passage 51 of stepped form, projecting from said end of the valve body.

The valve member 27′ has a cylindrical head 52 with a rubber face 53 to fit the enlarged annular end of the central passage 51 of the stepped boss 50, the stepped section 55 of the valve member slidably fitting the reduced portion of said passage.

A sealing member or O ring 56 is fitted in a groove in the stepped section 55 of the valve member 5′ to seal the passage as the latter is axially moved.

At the outer end the stepped section 55 of the valve member has a projecting stem 58 to contact in the open position of the valve member, the internal wall 59 of a hollow cylindrical nut 60 threaded upon the external projecting section 61 of the stepped hollow boss 50 as viewed in FIGURE 6.

In this open position the hollow nut 60 has been turned to free the projecting stem 58 of the valve member for outward axial movement of the latter from the valve chamber 12′, responsive to the pressure of the water in the supply pasasge of central tube 11 shown in FIGURE 3. The ports 20′ and 22′ are then opened for the discharge of water through the valve seat 15′ and the outlet ports 22′ in the valve chamber 12′ as hereinbefore described.

If the cylindrical nut 60 is turned in the reverse manner to force the projecting stem 58 inwardly the valve member 27′ is returned to the closed position, this movement being terminated by the inner end of said nut contacting the end face of the body 5′ of the valve. The valve seat 15′ being then axially retracted to again engage the valve member 27′ as hereinbefore described with reference to FIGURE 3.

In this construction the cylindrical body 5′ is plain, omits the grooves and parts for connecting the float actuated arms incorporated with the valve construction illustrated in FIGURES 1 to 5, the present construction being specifically suitable to provide a manually controllable tap which will give a full flow of liquid or water or rapid practically instant shut off upon a minimum turning of the central handle or knob in the form of the cylindrical nut 60.

I claim:

1. A float operated valve comprising a valve body having a valve chamber including a valve member to be actuated responsive to a float arm for axial movement to a closed position and released in that position for retractive movement to an open position responsive to water pressure in said chamber, a spaced coaxial valve seat slidable within said body responsive to water pressure and having a port for constant communication with a water inlet supply and normally engaged by the valve member in its closed position; said port in the open position of the valve member communicating with at least one outlet port in the valve chamber of relatively lesser area, the relative arrangement of said valve seat and valve member and the relative areas of said ports being such that said valve seat is axially displaced from the closed position responsive to pressure of water developed in the valve chamber as the valve member initially moves responsive to said pressure to the open position, and said valve seat effects an accelerated retractive movement to reengage with the valve seat responsive to the pressure in the water inlet pipe exceeding the pressure in the valve chamber resultant upon the float arm actuated return of the valve member to the closed position.

2. A float operated valve as claimed in claim 1 in which the valve body has two coaxial component parts one of which parts includes the valve member and outlet port or ports, the other part inserted into and sealably fitting said first part to form with the latter, the valve chamber and including an axial passage to communicate with the water inlet pipe, the slidable valve seat being sealably disposed between the component parts concentric with said passage with its valve engaging face projecting into the valve chamber in advance of said passage to provide an inner annular face about said port subjectable to the pressure of water in said passage.

3. A liquid flow control valve comprising a valve chamber, a valve member axially movable in said chamber to and retainable in a closed position until released for a liquid pressure responsive retractive movement to an open position, a spaced coaxial valve seat axially slidable responsive to liquid pressure relatively to the valve member to normally engage with the latter in its closed position and having a port for constant communication with a liquid flow supply, said port in tht open position of the valve member communicating with at least one liquid outlet port in the valve chamber of relatively lesser area, the relative arrangement of said valve seat and valve member and the relative areas of said ports being such that said valve seat and valve member are axially displaced apart from the closed position responsive to pressure of water developed in the valve chamber upon the valve member being initially released to move to the open position, said valve seat subsequently effects an accelerated retractive movement to reengage with the valve member responsive to the pressure in the liquid flow supply exceeding the pressure in the valve chamber resultant upon the actuated return of the valve member to the closed position, said valve member includes an end projection to freely contact a coaxial nut threaded onto the valve body and turnable in one direction to displace the valve member to the closed position, and upon subsequent turning in the reverse direction to free the valve member for retractive axial displacement to the open position, responsive to the water pressure in the valve chamber.

4. A liquid flow control valve according to claim 3 in which the valve member includes means operable to impart the axial movement of said valve member to the closed position, and to subsequently release said valve member to permit retractive axial movement of said valve member to the open position responsive to the liquid pressure in said valve chamber.

References Cited

UNITED STATES PATENTS

| 1,314,160 | 8/1919 | Stengel | 137—442 X |
| 1,677,687 | 7/1928 | Reed | 137—442 |

FOREIGN PATENTS

| 15,321 | 8/1916 | Great Britain. |

WILLIAM F. O'DEA, *Primary Examiner.*

D. R. MATTHEWS, *Assistant Examiner.*